(No Model.)
J. CHRISTENSEN.
VEHICLE BRAKE.
No. 550,067. Patented Nov. 19, 1895.
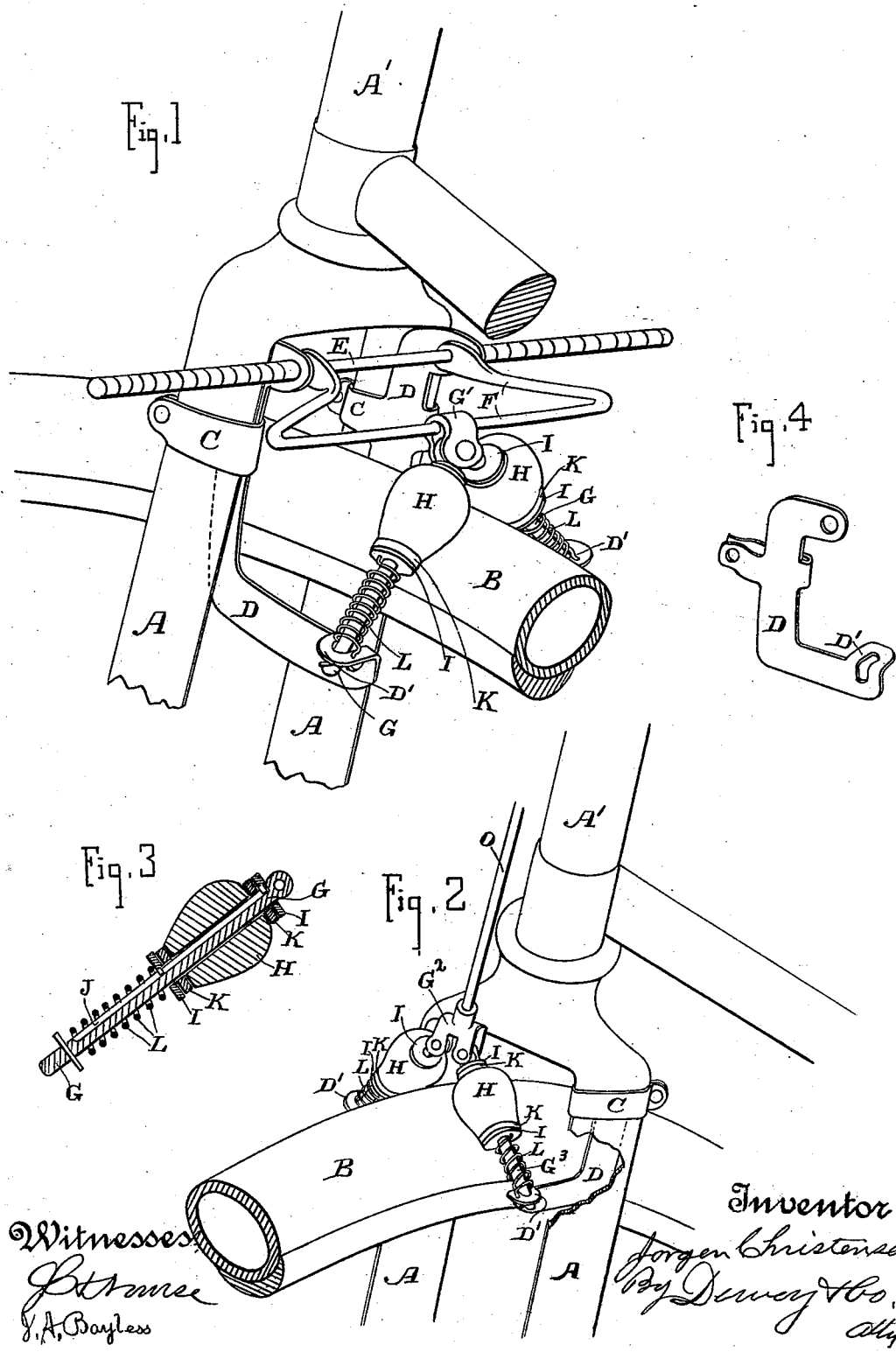
Witnesses
Bt Amee
J. A. Bayless
Inventor,
Jorgen Christensen
By Dewey & Co.
Attys

UNITED STATES PATENT OFFICE.

JORGEN CHRISTENSEN, OF SAN FRANCISCO, CALIFORNIA.

VEHICLE-BRAKE.

SPECIFICATION forming part of Letters Patent No. 550,067, dated November 19, 1895.

Application filed August 13, 1895. Serial No. 559,151. (No model.)

*To all whom it may concern:*

Be it known that I, JORGEN CHRISTENSEN, a citizen of the United States, residing in the city and county of San Francisco, State of California, have invented an Improvement in Vehicle-Brakes; and I hereby declare the following to be a full, clear, and exact description of the same.

My invention relates to an improvement in brakes for vehicles which is especially adapted for application upon bicycles.

It consists of certain details of construction, which will be more fully explained by reference to the accompanying drawings, in which—

Figure 1 is a perspective view of my device as applied to a bicycle, showing it as a foot-brake. Fig. 2 shows the device as a hand-brake. Fig. 3 is a longitudinal section of one of the rollers that form the brake. Fig. 4 is a view of one of the brackets.

The object of my invention is to provide a brake for bicycles and other vehicles in which the retarding pressure is applied to the rim or tire of the vehicle by means of rollers, which rotate in contact with the rim and have a means for increasing the friction and retarding their rotation directly in proportion as pressure is applied to force them against the rim.

I have in the present case shown my invention as applied to the front wheel of a safety-bicycle, in which A A are the forks, A' is the tube through which the steering-spindle passes, and B represents the wheel rim or tire revolving between the forks.

D are brackets stamped from single sheets of metal and having clamps C formed with them adapted to clasp the upper ends of the forks A, to which they are rigidly secured by screw-bolts. The bracket-arms D extend downwardly from these clamps and have their lower ends formed with slotted lugs, as shown at D'. In Fig. 1 these brackets are shown as projecting rearwardly from the forks, and in Fig. 2 they project to the front, so as to adapt them for a foot-brake in the first case or a hand-brake in the second. The upper ends of the brackets have holes made through them through which the fulcrum-shaft E passes. Upon this fulcrum-shaft is pivoted or journaled a yoke F, curved, as shown, and having a connecting-link G' turnable loosely about the central portion of its transverse bar. The shafts G in Fig. 1 have their upper ends pivoted to the lower end of this link and diverging from this point, so that the lower ends extend through the slots in the lugs D' of the brackets. Upon these shafts the rollers H are fitted to revolve, being suitably shaped so that they stand upon each side of the rim or tire of the vehicle, as shown. The shafts G extend a considerable distance below the rollers, and have washers I fitted to them above and below the rollers. The shafts are grooved longitudinally, as shown at J, and the washers have inwardly-projecting tongues which fit these grooves and prevent them from turning. Between the washers and the ends of the rollers are fitted disks K, made of leather, vulcanite, fiber, or other suitable material, which will not wear too easily and which form a frictional contact against the ends of the rollers.

Surrounding the shaft G, below the rollers, are spiral springs L, having considerable tension, the lower ends pressing against the lugs D' of the brackets and the upper ends acting against the washers below the rollers. These springs act to normally press the rollers up against the upper disks and washers, and also to raise them sufficiently to be out of contact with the rim or tire upon each side of which they stand.

When the brake is to be applied, the yoke F is depressed, and, acting through the link upon the shafts G, it causes the shafts to slide through the guide-openings in the lugs D', the spring being correspondingly compressed until the rollers come into contact with the opposite sides of the tire. This compression of the springs acts to correspondingly increase the pressure of the disks or washers upon the ends of the rollers, and thus cause them to rotate with increasing difficulty, so that as the pressure upon the yoke is increased the rollers will be pressed more forcibly against the tire, and at the same time the friction which prevents their turning will be increased to any desired degree.

If the device is used as a foot-brake, as shown in Fig. 1, it will be manifest that it is only necessary to place the foot upon the rearwardly-projecting yoke and depress it as much as may be desired. In this case extensions may be fitted upon each end of the shaft E, which will serve as foot-rests, from which the movement of the foot will easily act upon the yoke.

If it is desired to apply the device as a hand-brake, as shown in Fig. 2, the link $G^2$ at the upper ends of the shafts $G^3$ may then be connected with the plunger-rod O of the ordinary hand-brake, the operation being essentially the same as previously described.

Having thus described my invention, what I claim as new, and desire to secure by Letters Patent, is—

1. In a brake for vehicles, revoluble rollers upon shafts which converge upon opposite sides of the wheel, said shafts being flexibly united at their upper ends, having their lower ends slidable in guides, a means connected with the jointed ends of the shafts for tilting said shafts, so as to move them in lateral planes to or from the wheel rim, disks pressing against the upper and lower ends of the rollers and springs surrounding the shafts and compressible between the guides through which the shafts are slidable, and the disks at the lower ends of the rollers.

2. A brake for vehicles, consisting of revoluble rollers upon shafts which converge upon opposite sides of the wheel rim, a tilting yoke with which said shafts are flexibly united at their upper ends, guides through which the lower divergent ends of the shafts are slidable by the depression of the yoke, disks forming contact with the ends of the rollers, washers exterior to the disks, having tongues fitting in longitudinal slots in the shafts, whereby the washers are prevented from rotating, and spiral springs surrounding the lower ends of the shafts and compressible between the guides and the lower washers, whereby the resistance to the rotation of the rollers is increased by the depression of the yoke.

3. A brake for vehicles, consisting of revoluble rollers upon shafts which converge upon opposite sides of the wheel, said shafts being flexibly united at their upper ends, having their lower ends slidable through guides, and brackets on which said guides are formed, said brackets being formed with clamps adapted to clasp and be secured upon the forks of the machine, springs surrounding the shafts between the lower ends of the rollers and the bracket lugs, washers fitting on the shafts, having tongues which engage longitudinal slots in the shafts, and frictional disks interposed between the washers and the ends of the rollers.

In witness whereof I have hereunto set my hand.

JORGEN CHRISTENSEN.

Witnesses:
S. H. NOURSE,
JESSIE C. BRODIE.